United States Patent
Amano et al.

(10) Patent No.: US 6,426,608 B2
(45) Date of Patent: Jul. 30, 2002

(54) AUTOMOBILE AND POWER SUPPLY SYSTEM THEREFOR

(75) Inventors: Masahiko Amano, Hitachiota; Ryoso Masaki; Yasuo Morooka, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/883,350

(22) Filed: Jun. 19, 2001

(30) Foreign Application Priority Data

Jun. 19, 2000 (JP) ........................................ 2000-187503

(51) Int. Cl.⁷ .................................................. H02J 7/06
(52) U.S. Cl. ........................................ 320/163; 320/162
(58) Field of Search ................................. 320/163, 162, 320/110; 307/24, 46, 66, 75, 76

(56) References Cited

U.S. PATENT DOCUMENTS

| 4,491,779 A | 1/1985 | Campbell et al. ............... 320/6 |
| 4,686,442 A | 8/1987 | Radmonski ................... 320/17 |
| 5,355,071 A | 10/1994 | Ishida et al. .................... 320/6 |
| 5,552,681 A | * 9/1996 | Suzuki et al. ................. 307/66 |
| 5,717,579 A | 2/1998 | Sohner ........................ 363/17 |

FOREIGN PATENT DOCUMENTS

| DE | 3743317 | 6/1989 |
| DE | 19724356 | 5/1998 |
| EP | 0584373 | 3/1993 |
| FR | 2694144 | 1/1994 |
| JP | 03159528 | 7/1991 |
| JP | 4-308430 | 10/1992 |
| JP | 4-325839 | 11/1992 |

OTHER PUBLICATIONS

Stefan Müller et al., "Considerations Implementing a Dual Voltage Power Network", Xaver Pfab in BMW AG (Munich, Germany) (Conf. 19–21/98).

* cited by examiner

*Primary Examiner*—Jessica Han
*Assistant Examiner*—Lawrence Luk
(74) *Attorney, Agent, or Firm*—Crowell & Moring LLP (57) ABSTRACT

In an automobile power supply where plural voltages can be supplied, a plurality of batteries and a DC/DC converter are assumed to be unnecessary, and it is possible to operate even when the controller breaks down.

High-voltage terminal 11 and low-voltage terminal 12 are provided in battery 6. High-voltage FET 4 for controlling the power supply in one direction from high-voltage terminal 11 to inverter 3 is connected between inverter 3 and high-voltage terminal 11. Low-voltage FET 5 for controlling the power supply in one direction from inverter 3 to low-voltage terminal 12 between inverter 3 and low-voltage terminal 12 is connected.

10 Claims, 6 Drawing Sheets

AUTOMOBILE AND POWER SUPPLY SYSTEM THEREFOR

BACKGROUND OF THE INVENTION

The present invention relates to an automobile which needs a plurality of different voltages, in order to correspond to the increase in the consumption of the electric power in an automobile, and the power-supply unit therefor. Especially, the present invention relates to a technology suitable to achieve a plurality of voltage power supply at low-cost.

To realize an electric operation and a large capacity of on-board equipment such as electric power steerings and electric air conditioners provided in automobiles, 42V automobile electric power supply system in which the 42V-system power supply is added to the conventional 14V-system power supply is proposed. The electric current decreases to ⅓ of the conventional current amount because the voltage increases to three times that of the conventional power supply in the 42V-system power supply. Therefore, the decrease in the power loss, the weight saving of the harness, and the adoption of the high-power load, etc. become possible.

However, because making the electric power load like a lamp system, etc. a 42V-system is difficult, it is expected that two kinds of voltages of 14V and 42V are used for the present time.

The system having both of the battery (rated voltage 36V) for 42V and the battery (rated voltage 12V) for 14V is proposed, in which the battery for 42V is charged by an alternator and the battery for 14V through a DC/DC converter.

Another method is proposed to reduce the cost, in which the switch switches the output of the alternator to the 42V side or the 14V side, and the DC/DC converter is omitted.

A further method is proposed, in which two batteries are connected in series, two kinds of voltage terminals are provided, and the charge to each battery is switched by switching the switching element. If this method is applied to 42V power supply, the battery for 14V need not be separately prepared because the battery gives the terminal for 14V for 42V. An example of this method is described in the U.S. Pat. No. 4,686,442.

A further method is proposed to increase the efficiency of the alternator and the lifetime of the starter, in which the function of the starter and the alternator is integrated and the motor/generator controlled by the inverter is applied to the 42V-power supply.

There is a problem that the battery cannot be charged at all when the controller for controlling the switch breaks down, and the switch cannot be turned on, in the method in which the output of the alternator is switched to 42V side or 14V side with switch among the above-mentioned methods. Moreover, it is necessary to provide the battery for 14V besides the battery for 42V, and thus the cost rises.

In the method that two batteries are connected in series, two kinds of voltage terminals are provided, and the charge to each battery is switched by switching the switching element, only the direction of the charge from the alternator is considered in the configuration of the switching element. Therefore, there is a problem that it is not possible to apply the method to the motor/generator in which the function of the starter is integrated, because the electric current cannot flow into the direction of the electric discharge.

In either example, the change in the power-supply voltage occurred when the switch is changed is not considered.

SUMMARY OF THE INVENTION

An object of the present invention is to provide an automobile and the power-supply unit therefor operable even if the DC/DC converter is not used, a plurality of batteries are not needed, and the controller for controlling the switch breaks down.

Another object of the present invention is to provide an automobile and the power-supply unit therefor which can control so that the change in the power-supply voltage may decrease when switching on/off.

A power-supply unit of the automobile according to the present invention includes a battery having a high-voltage terminal and a low-voltage terminal, a converter for converting AC power into DC power, a first switching element for controlling the power supply in one direction from the high-voltage terminal of the battery to the converter, and a second switching element for controlling the power supply in one direction from the converter to the low-voltage terminal of the battery.

It becomes possible to achieve a power supply system with a plurality of voltages without using a DC/DC converter by this configuration.

Further, because a plurality of voltage terminals are provided in one battery, it is not necessary to provide a battery separated for each voltage.

Preferably, the first and the second switching element of the present invention comprise a field effect transistor and diodes connected mutually and oppositely.

Preferably, the voltage at the DC side of the converter is controlled to the voltage of the high-voltage terminal side or that of the low-voltage terminal side according to the on/off state of the switching element.

Preferably, even when it becomes impossible to control the first and the second switching element due to the breakdown of the controller, the voltage of the DC side of the converter is controlled according to the direction of the electric power converted by the converter.

Even when it becomes impossible to control the switching elements hereby, the charge to the high-voltage terminal side and the electrical discharge from the low-voltage terminal side are always possible due to the operation of the diode connected mutually and oppositely. Therefore, the automobile can be operated until the remaining amount of the low-voltage terminal side of the battery is run out.

Preferably, the present invention further comprises the charging rate measuring means for measuring the charging rate at the high-voltage terminal side of the battery and that at the low-voltage terminal side, respectively. The first and the second switching element are controlled. according to the measured charging rate.

As a result, it is possible to control so as not to cause the unbalance in the battery charging rate at the high-voltage terminal side and the low-voltage terminal side, and the deterioration of the battery performance due to the unbalance of the charging rate can be prevented.

Preferably, in the present invention, when the DC voltage is controlled by the converter, the voltage of another voltage terminal not controlled is detected directly, and the voltage control system is corrected.

As a result, it becomes possible to control so that the terminal voltage does not greatly change even when the switching element is switched.

An automobile of the present invention has a motor/generator; an inverter for driving said motor/generator; a battery connected to said inverter through the terminals at a plurality of different voltages; a first switching element provided between said inverter and a first fixed terminal of the terminals at a plurality of different voltages of said battery; a first rectifying device connected in parallel with the intermittence-switching means provided in said first switching element, for throwing more electric currents in the direction of said first terminal from said inverter; a second switching element provided between said inverter and a second terminal at a voltage lower than that of said the first terminal of the terminals of a plurality of different voltages of said battery; a second rectifying device connected in parallel with the intermittence-switching means provided in said second switching element, for throwing more electric currents in the direction of said second terminal from said inverter; and a battery control unit for turning on/off said first and said second switching element according to the state of the charge of said battery.

Further, in the automobile of the present invention, said first switching element and said first rectifier, and said second switching element and said second rectifier are a first and a second field effect transistor, respectively.

DETAILED DESCRIPTION OF THE PREFERRED EMBODIMENTS

Hereinafter, the embodiments of the present invention will be explained referring to the drawings.

Figure 1:
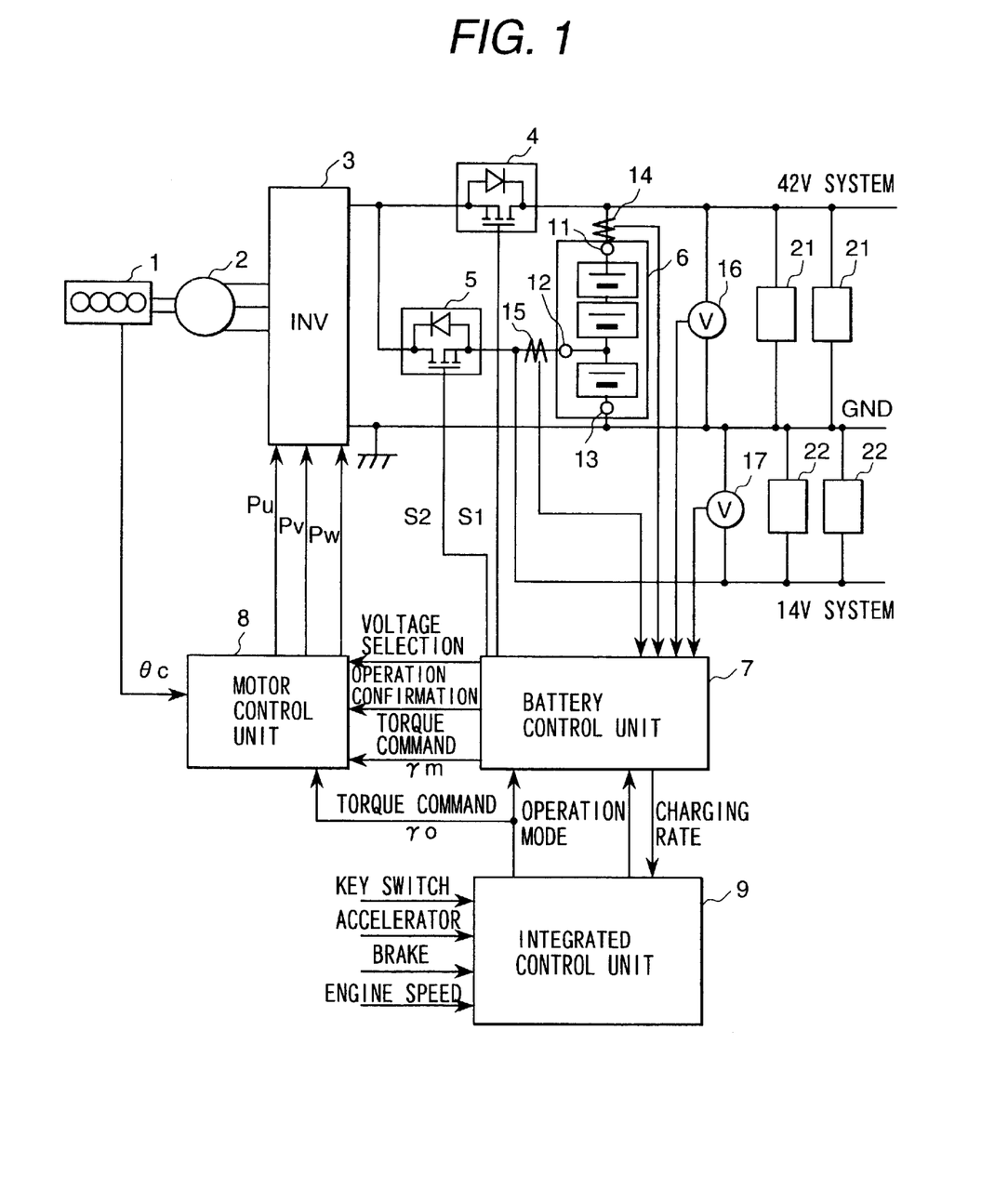
FIG. 1 shows the configuration of an automobile power-supply unit according to one embodiment of the present invention.

FIG. 1 shows an example of the configuration of the automobile power supply in which two voltage systems of 42V-system and 14V-system are provided. The start-up and the power generation of engine 1 is performed by motor/generator 2 connected on a rotation axis of the engine 1. The driving force and the generated output of motor/generator 2 are controlled by inverter 3. When the engine is started up, the DC voltage of the battery 6 is converted into an AC voltage with inverter 3. As a result, the engine 1 is rotated by the driving torque generated by the motor/generator 2 After the engine 1 is started up, an AC voltage is generated in the motor/generator 2 by the rotation of the engine. This AC voltage is converted into the DC voltage by inverter 3, and is charged in the battery 6.

The battery 6 has a high-voltage terminal 11 and a ground terminal 13 for 42V (rated voltage 36V). Further, it also has a low-voltage terminal 12 to supply the electric power to a 14V-system load. It should be noted that the battery can be either of integrated type or separated type in which three battery blocks for 14V (rated voltage 12V) are connected in series. In the configuration in which three battery blocks are connected in series, there are advantages in that it is possible to replace the order of connection in a certain period of time, or to exchange every block. In addition, it is possible to combine the battery for 28V (rated voltage 24V) with the battery for 14V.

A plurality of 42V-system loads 21 of the comparatively high-power such as an electric power steering and an electric air conditioner are connected to the high-voltage terminal 11 for 42V. To the low-voltage terminal 12 for 14V, 14V-system loads 22 such as lamps and various controllers, that low voltage is advantageous, are connected. Moreover, because the voltage between the high-voltage terminal 11 and the low-voltage terminal 12 becomes 28V, it is also possible to connect loads for 28V between these two terminals.

The connection between the inverter 3 and the battery 6 is performed as follows. First of all, the negative electrode side of the inverter 3 is connected to the ground terminal 13 of the battery 6. The high-voltage FET (field effect transistor) 4 or the first switching element is connected between the high-voltage terminals 11 of the battery 6 and the positive electrode of the inverter 3, and the low-voltage FET (field effect transistor) 5 or the second switching element is connected between the low-voltage terminals 12 of the battery 6 and the positive electrode of the inverter 3. The source of the high-voltage FET 4 is connected to high-voltage terminal 11, and the drain is connected to inverter 3. Even if the switch is off, the electric current from the inverter 3 to the high-voltage terminal 11 can be allowed by the inverse-connection diodes (rectifier) provided in the high-voltage FET 4. The source of the low-voltage FET 5 is connected to the positive electrode of the inverter 3, and the drain is connected to the low-voltage terminal 12. Even if the switch is off, the electric current from the low-voltage terminal 12 of the battery 6 to the inverter 3 can be allowed by the diode provided in the low-voltage FET 5.

Namely, the high-voltage FET 4 acts as a switching element to control the power supply in one direction of the inverter 3 from the high-voltage terminal 11 of battery 6. Further, the low-voltage FET 5 acts as a switching element to control the power supply in one direction of the low-voltage terminal 12 of the battery 6 from the inverter 3. These FETs comprise an intermittence-switching means for switching on/off the internal circuit and a rectifying device provided in parallel with the intermittence-switching means.

The integrated control unit 9 provides operation mode instructions of engine start-up, charge, assist, and regeneration, etc. to battery control unit 7, based on driver's key switch operation, accelerator operation, brake operation, and battery charging rate, etc. Further, the integrated control unit 9 provides a torque instruction τo indicative of the torque to be output by the motor/generator 2.

Battery control unit 7 controls the high-voltage FET 4 and the low-voltage FET 5 which are the switching element according to the state of the charge of the battery 6. Here, the switching is performed by operating the voltage of the gates of the high-voltage FET 4 and the low-voltage FET 5. Moreover, the voltage selection signal is given to motor control unit 8 corresponding in the state of the switch. The driving torque or the power generation torque to be generated by motor/generator 2 is determined based on the instruction from integrated control unit 9, and a torque instruction τm is given to the motor control unit 8. In addition, an operation confirmation signal indicative whether the battery control unit 7 operates normally.

The motor control unit 8 outputs PWM signals Pu, Pv, and Pw to the inverter 3 based on the voltage selection signal, the torque instruction and the crank angle signal θc of the engine 1 from the battery control unit 7. Moreover, the motor control unit 8 inputs the operation confirmation signal from the battery control unit 7. If the battery control unit 7 does not operate normally, special processing in abnormal circumstances is performed.

Figure 8:
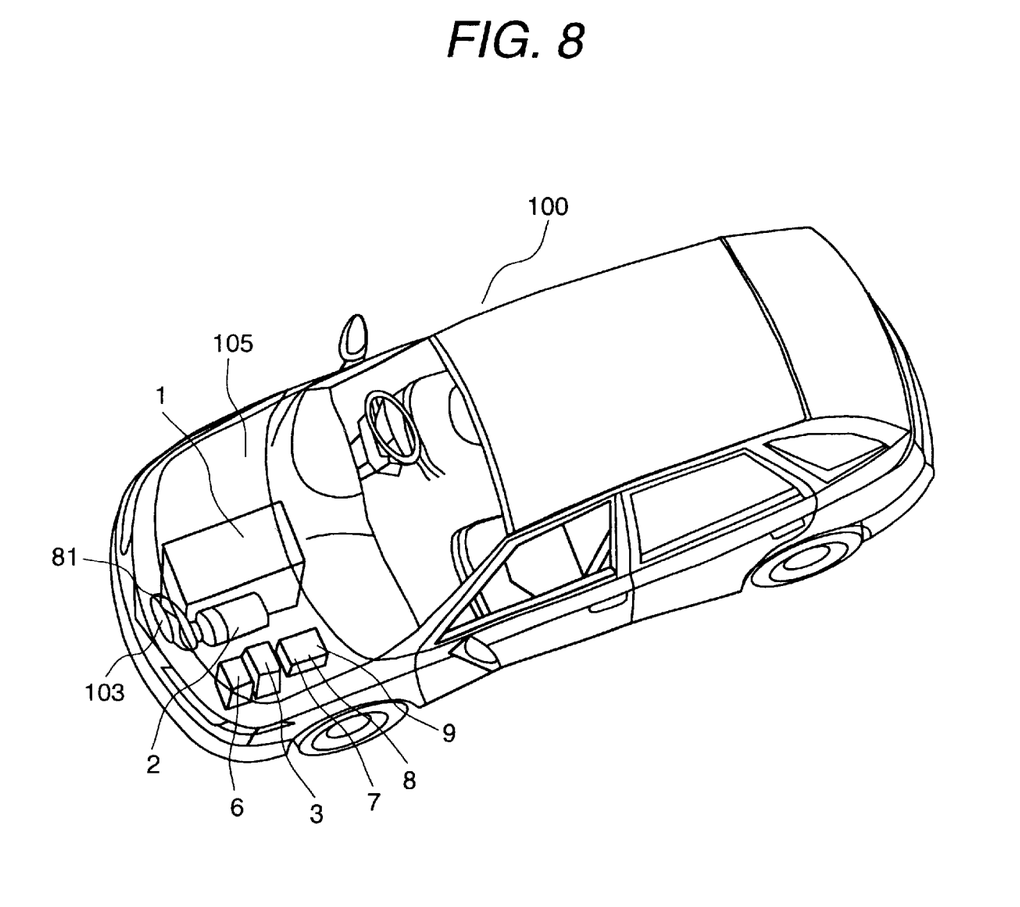
FIG. 8 shows an example of the automobile equipped with the device of FIG. 1.

An example of the automobile installing the device of FIG. 1 is shown in FIG. 8.

In FIG. 8, the motor/generator 2 is installed outside of engine 1 in the horizontal putting method. Namely, belt 81 is bridged between the motor/generator 2 and the pulley 103 of a crank shaft, and, as a result, the driving force is bidirectionally transferred between the engine 1 and the motor/generator 2. The arrangement of the motor/generator 2 can be properly changed according to the convenience of the arrangement of engine 1, and the arrangement of the motor/generator 2 is not limited whether it is put longitudinally or horizontally.

Although the equipment and units, etc. such as battery 6, inverter 3, battery control unit 7, motor control units 8 and integrated control unit 9 other than the motor/generator 2 are arranged in engine rooms 10, it is also possible to properly change the arrangement according to the convenience of the arrangement of the vehicle-relevant equipment (not shown in the figure), and to arrange in the place other than the engine room 105. Further, although the battery control unit 7, the motor control unit 8, and the integrated control unit 9 are shown in the figure as one housing, it is also possible to arrange them in another housing, and to put the inverter 3 into the same housing as one for other controllers.

In this embodiment, the engine 101 and the motor/generator 2 are mechanically connected via the belt 81, however, the configuration in which the crank shaft 102 of the engine 101 and the motor/generator 2 are connected directly for instance, is acceptable. Further, it is needless to say that various connected configurations can be adopted.

Hereinafter, the configuration and the operation of the battery control unit 7 will be explained in detail.

Figure 2:
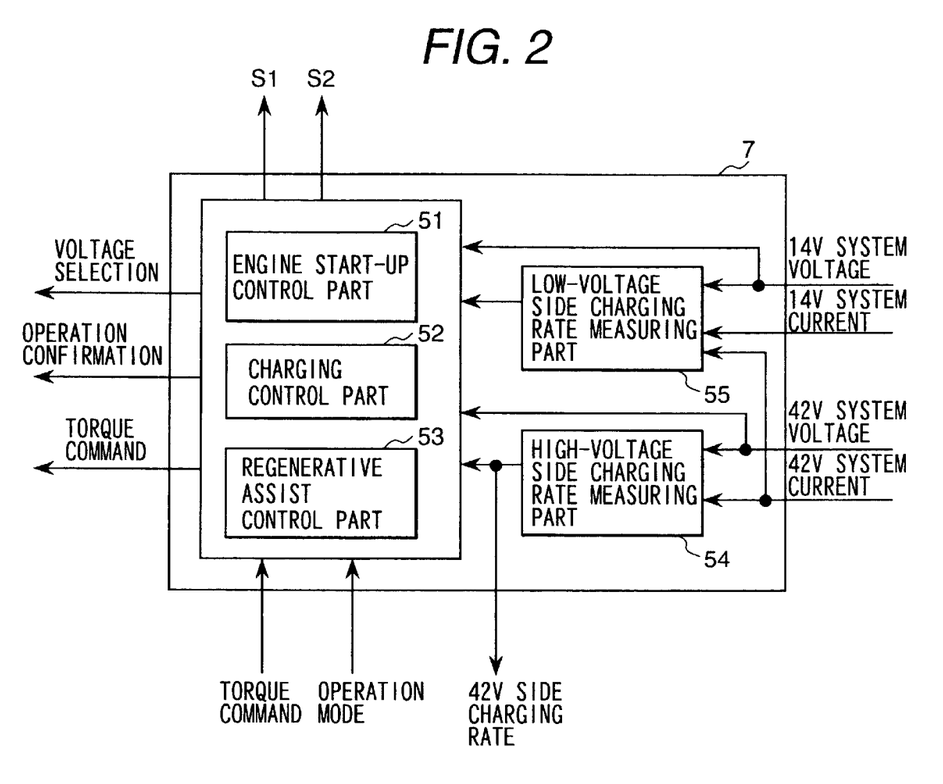
FIG. 2 shows the configuration of the battery control unit 7 of FIG. 1.

FIG. 2 shows the configuration of the battery control unit 7. First of all, high-voltage side charging rate measuring part 54 measures the charging rate of a high-voltage side battery based on the output of the electric current measuring means 14 and the voltage measuring means 16. Similarly, low-voltage side charging rate measuring part 55 measures the charging rate of a low-voltage side battery based on the output of the electric current measuring means 14, 15 and the voltage measuring means 17. The charging rate of the high-voltage side battery is output to the integrated control unit 9. The high-voltage side battery indicates the battery block between the high-voltage terminal 11 and the low-voltage terminal 12, and the low-voltage side battery indicates the battery block between the low-voltage terminal 12 and the ground terminal 13.

Although there are various methods as a method of measuring charging rate, the method of obtaining the charging rate according to the predetermined characteristic data is adopted in this embodiment, based on the integrated value of the electric current which flows to the battery, and the voltage and the current value. Because there is a suitable measurement means by the kind of the battery such as lead, nickel hydrogen, and the lithium ion, it is, therefore, preferable to use them properly.

It should be noted that the electric current which flows to the low voltage battery is equal to the total value of the electric current of electric current measuring means 14 at 42V side and the electric current measuring means 15 at 14V side.

An actual control is performed based on the charging rate and the voltage measured value of the battery obtained in the above-mentioned method. Either of the engine start-up control unit 51, the charge control unit 52, and the regenerative assist control unit 53 operates according to an operation mode output by the integrated control unit 9, and outputs a control signal.

First, the case of the engine start-up will be explained. The engine start-up control unit 51 operates and starts to control when the engine start-up instruction is output as an operation mode signal from the integrated control unit 9 based on driver's key switch operation. In an automobile having an idling stop function, the engine start-up instruction is output based on the shift operation, the brake operation, and the accelerator operation, etc. besides the key switch operation.

Figure 3:
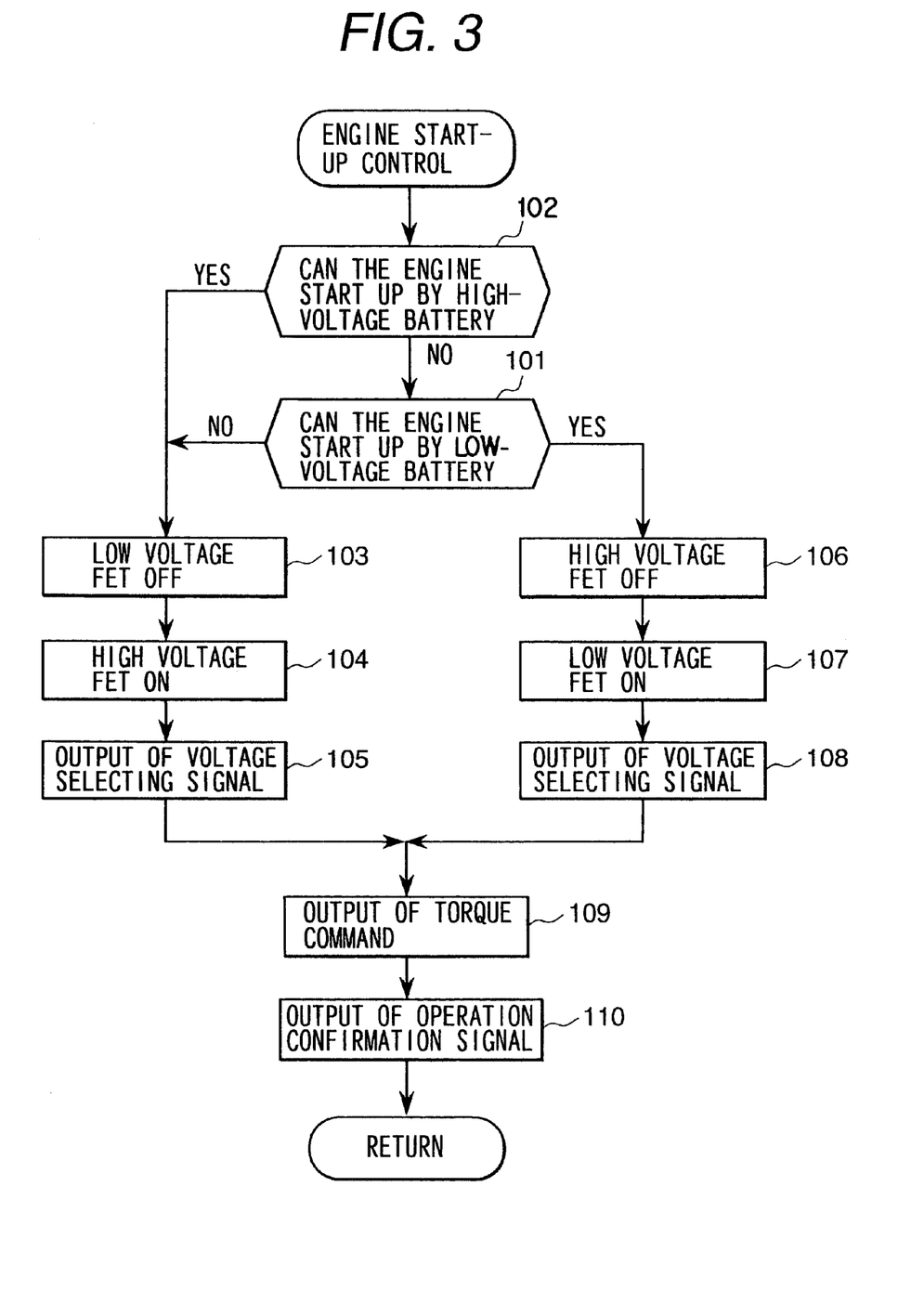
FIG. 3 shows the processing flow of the engine start-up control unit 51 of FIG. 2.

FIG. 3 shows a processing flow of engine start-up control unit. It is examined first whether it is possible to start up the engine by using the high voltage battery (step 101). it is judged whether it is possible to start up the engine, based on whether the charging rate measured by the high-voltage side charging rate measuring part 55 is more than a predetermined value, or whether the voltage value of the high voltage system (42V-system) is more than a predetermined value. Even if the battery charging rate is small, and it is judged that start-up is possible by a so-called jump-start in the case that the voltage is more than the predetermined value by connecting the battery of another automobile. The processing advances to steps 103–105 if the start-up is possible. The low-voltage FET 5 is turned off and the high-voltage FET 4 is turned on. And the voltage selection signal indicative of the selection of 42V is output.

The processing advances to step 102 if it is impossible to judge that the start-up by the high-voltage battery is possible. In the step, it is judged whether it is possible to start up the engine, based on whether the charging rate of the low-voltage battery is more than a predetermined value, or whether the voltage value of the low voltage system (14V-system) is more than a predetermined value, in the same way as step 101. If the start-up is possible, the processing advances to steps 106–108. The high-voltage FET 5 is turned off and the low-voltage FET 4 is turned on. And the voltage selection signal indicative of the selection of 42V is output.

The processing advances to step 103 if it can not be determined that the start-up by the low voltage battery is possible. In the step, the start-up by the high voltage battery is tested in this example. If it is desirable to avoid the battery over discharge, it may give up the start-up of the engine with indicating the incapability of the engine start-up, and may adopt the method of urging the jump start with the battery of another automobile.

The processing advances to step 109 when the voltage selection signal is output, and the torque instruction is output in the step. Instruction τo output by the integrated control unit 9 is used as it is for the start-up of the engine as torque instruction value τm. Finally, the operation confirmation signal indicative of whether the battery control unit operates normally is output (step 110).

According to this embodiment, there is a feature that the engine start-up can surely be done because the voltage is switched judging whether the start-up becomes possible by using which voltage. Further, there are effects that the start-up is possible by using either voltage of 42V and 14V, and the judgment of the voltage can be automatically executed, with regard to the jump start by the battery of another automobile.

Next, the case that the engine 1 is started and the battery is charged by the motor/generator 2, will be explained. After it is confirmed that the engine is turned over, the charge instruction is output as an operation mode signal by the integrated control unit 9. In the automobile with the regenerative braking function, it is not possible to regenerate when the charging rate of the battery becomes 100%. Therefore, the charging instruction is output in consideration of the charging rate information in order to keep the charging rate about 90% or less for instance.

Figure 4:
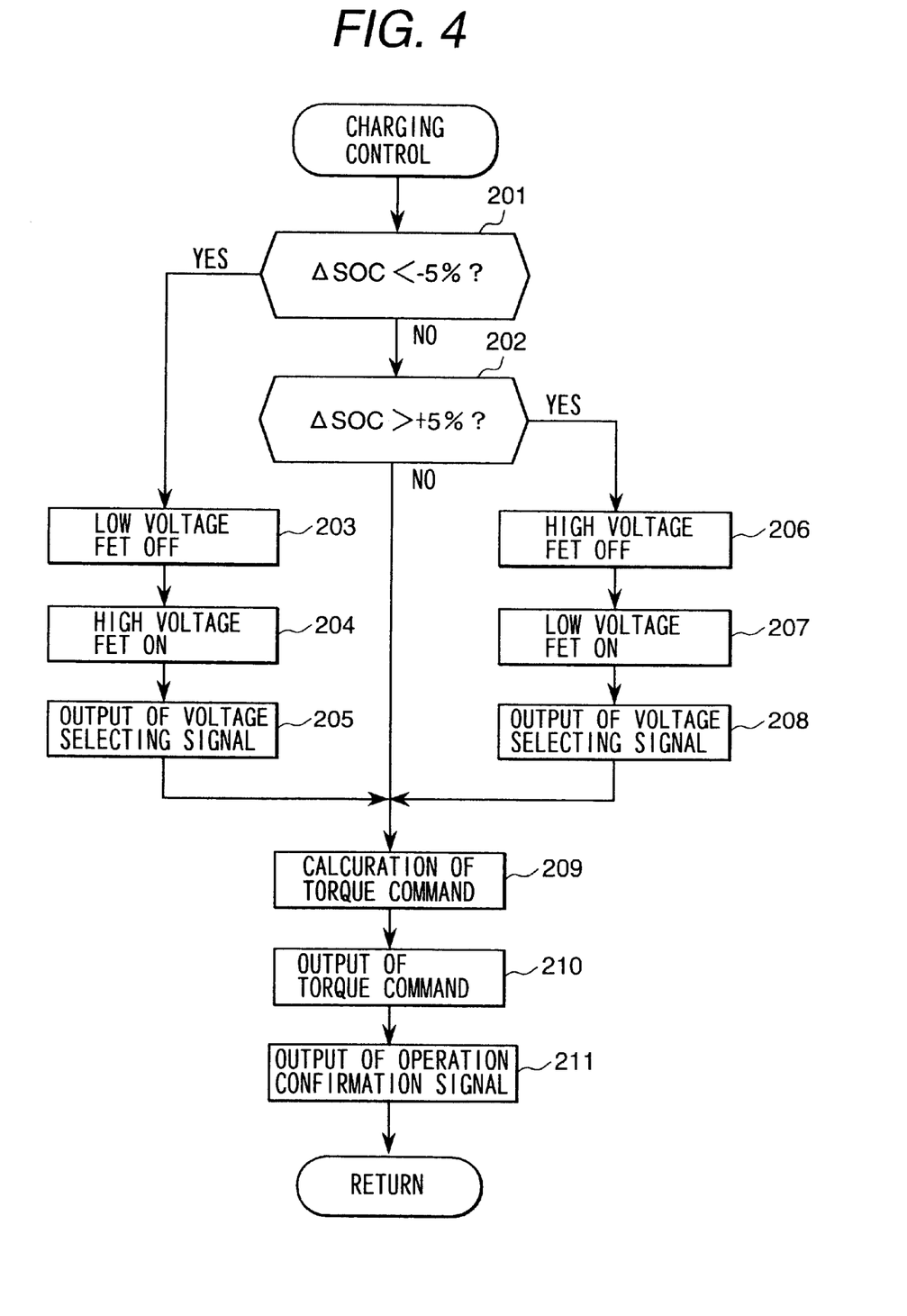
FIG. 4 shows the processing flow of the charge control unit 52 of FIG. 2.

In the battery control unit 7, the charge control unit 52 operates and the charge is controlled according to the flow shown in FIG. 4. When charging the battery, it is necessary to control the high-voltage FET 4 and the low-voltage FET 5 so as not to cause a big unbalance in the charging rate of a high-voltage side battery and a low-voltage side battery. Here, the difference between the charging rate of a high-voltage side battery and the charging rate of a low-voltage side battery is assumed to be $\Delta SOC$. This $\Delta SOC$ is adjusted between ±5%.

It is checked whether $\Delta SOC$ is smaller than −5% in step 201. If so, the low-voltage FET 5 is turned off and the high-voltage FET 4 is turned on, and thus the inverter 3 is connected to 42V -system so that the charging rate of the high-voltage side battery may increase (steps 204–205). A signal indicative of the selection of 42V is output as a voltage selection signal in step 206. Then, the processing advances to step 209. If $\Delta SOC$ is −5% or more, the processing advances to step 202. In the step, it is checked whether $\Delta SOC$ is larger than +5%. If larger than +5%, the low-voltage FET 5 is turned on and the high-voltage FET 4 is turned off, and thus the inverter 3 is connected to 14V-system so that the charging rate of the low-voltage side battery may increase. Then 14V is output as a voltage selection signal (step 206–208), and the processing advances to step 209. If $\Delta SOC$ is +5% or less, the switch is not changed and the processing advances to step 209. In step 209, the charge torque to be generated by the motor/generator 2 is calculated. The calculated torque is output in step 210. Finally, the operation confirmation signal is output in step 211.

According to the above-mentioned method, the deterioration of the battery performance by the unbalance of the charging rate between the battery blocks is prevented because the difference of the charging rate of the high-voltage side battery and the low-voltage side battery is always controlled to become a predetermined value or less. There is a method of changing the switch in consideration of not only $\Delta SOC$ but also engine speed. Because the induced voltage of the motor/generator 2 increases when the engine speed is high, the inverter is connected to 42V-system. Oppositely, when the engine speed is low, the inverter is connected to 14V-system. As a result, there is an effect that the efficiency of the generation can be able to be improved because the voltage suitable for the induced voltage of the motor is selected.

Although $\Delta SOC$ was controlled so as to fall within the predetermined range in the flow of FIG. 4, it is also possible to control to keep $\Delta SOC$ almost 0 by switching over more frequently. For instance, the on/off switch of the high-voltage FET 4 and the low-voltage FET 5 is made to be performed without fail for the cycle or 10 ms, and the period when high-voltage FET 4 turns on is changed according to $\Delta SOC$. If $\Delta SOC$ is positive, the period when high-voltage FET 14 turns on is lengthened, and If $\Delta SOC$ is negative, the period when the high-voltage FET 4 turns on is shortened oppositely. The control by which $\Delta SOC$ is kept almost 0 always becomes possible by adjusting the degree (gain) by which the period is changed.

Figure 5:
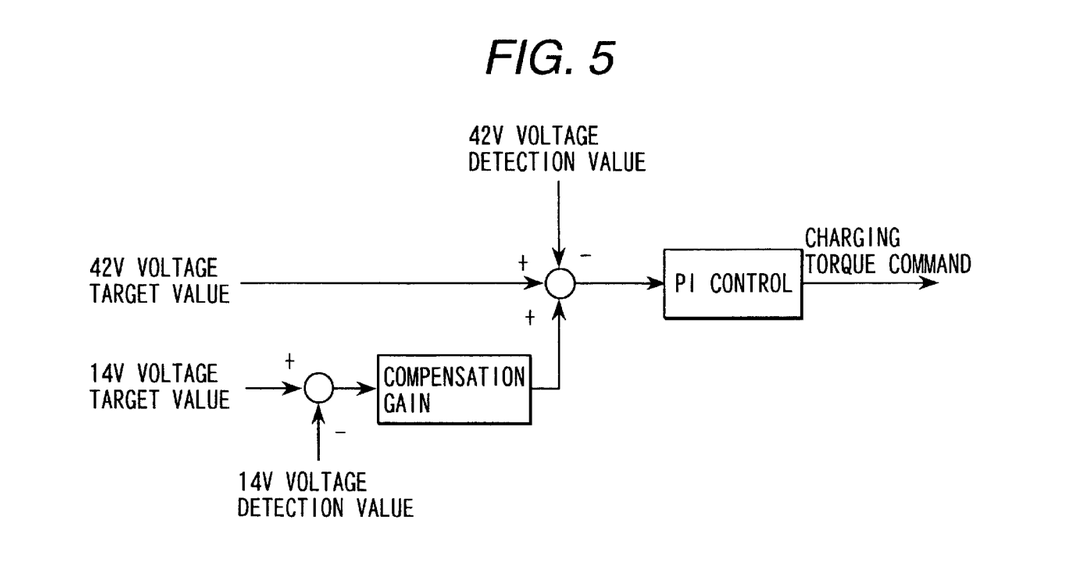
FIG. 5 shows the control block illustrating the method of operating the torque instruction in the charge control unit 52 of FIG. 2.

In step 209, the power generation torque to be output the motor/generator 2 is calculated. A method of maintaining a target value the DC voltage will be explained with reference to FIG. 5. For instance, when the inverter is connected to the 42V-system, the charge torque is calculated based on the difference between the voltage target value and the voltage measured value of 42V-system. If the voltage measured value is lower than the voltage target value, the charging torque is increased. As a result, the charging current which flows to the battery is increased, and the voltage of 42V-system increases. For instance, the proportional-plus-integral control (PI control) can be used as a control method. In that case, the difference between the voltage target value and the voltage measured value of 14V-system is calculated, the correction gain is multiplied, and the product is added to the voltage target value of 42V-system. It is important to control so that the voltage should not change when switching over, because the load in which the change in voltage is undesirable like the lamp load etc. is connected to 14V-system. It is possible to control to keep the voltage of 14V-system in the neighborhood of the target value even when the inverter is connected to 42V-system by using the method shown in FIG. 5.

Next, The case in which the regenerative braking or the engine assistance is instructed as an operation mode will be explained. In this case, the regenerative assist control part 53 is operated, and the control is executed. The possibility that the electric power that both the regenerative braking and the engine assist charges or discharges a big power into or from the battery is high. Therefore, the low-voltage switch 5 is basically turned off and the high- voltage switch 4 is turned on, and the inverter is connected to the high-voltage side. Torque instruction value $\tau o$ output by the integrated control unit 9 is output as it is as a torque instruction. The same processing step as steps 103–105 and steps 109–110 of FIG. 3 is performed.

Next, the operation of the motor control unit 8 will be explained.

Figure 6:
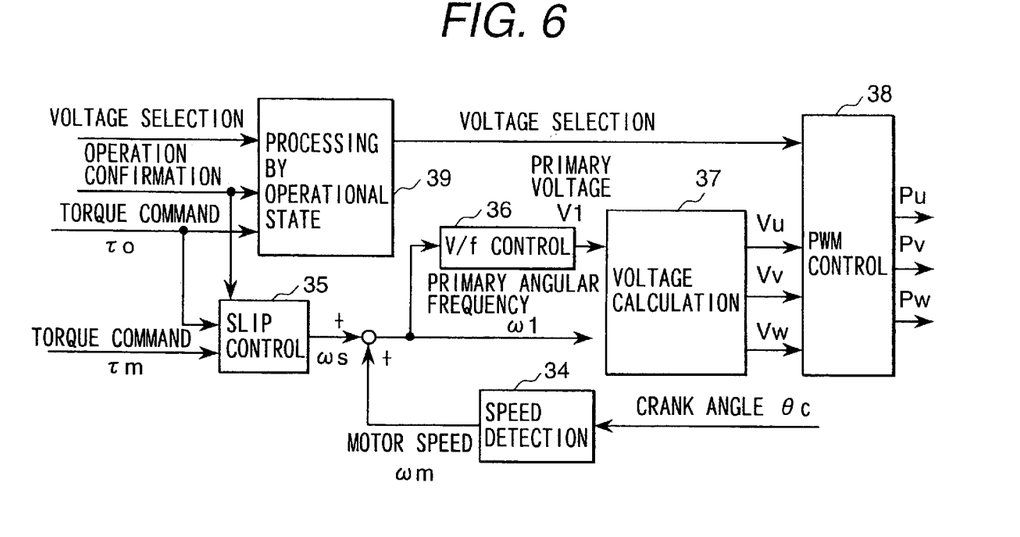
FIG. 6 shows the control block of motor control unit 7 of FIG. 1.

FIG. 6 shows the control block , in which the induction machine is used as the motor/generator 2. First of all, slipping angular frequency $\omega s$ of the motor/generator 2 is determined by the slip control part 35 based on the torque instruction value $\tau m$ output by the battery control unit 7. Not $\tau m$ but torque instruction value $\tau o$ output by integrated control unit 9 is used, when judged that the battery control unit is abnormal based on the operation confirmation signal from the battery control unit 7. In speed sensing unit 34, the motor speed $\omega m$ is calculated from the crank angle $\theta c$ of engine 1. It is not necessary to use the dedicated rotation sensor by detecting speed $\omega m$ of the motor by using crank angle $\theta c$, because the motor/generator 2 is directly connected to the engine 1. Next, primary angular frequency $\omega 1$ of inverter 3 is calculated based on the sum of the speed $\omega m$ and slipping angular frequency $\omega s$. Moreover, the primary voltage V1 is calculated from the primary angular frequency $\omega 1$ so that the electric current which flows to motor/generator 2 may almost become constant. This is a method referred generally as the V/f control, in which the value of $V1/\omega 1$ is controlled to be constant, or becomes a fixed function. This calculation is carried out in the V/f control unit 36. The voltage instruction Vu, Vv, and Vw of respective phase are calculated from primary voltage V1 and primary angular frequency ω1 by the voltage calculating part 37. Next, these signals are converted into PWM signal Pu, Pv, and Pw in the PWM control unit 38 so that the voltage of motor/generator 2 may become voltage instruction Vu, Vv, and Vw, and are output to the inverter 3. Because the DC voltage of inverter 3 is decided depending on the voltage of the connected battery, the PWM signal is calculated by inputting the voltage selection signal obtained in processing part 39.

When the abnormality is not found in the operation confirmation signal of the battery control unit 7, the processing part 39 outputs the voltage selection signal as it is. The following processing is performed when judged that the abnormality is found by operation confirmation signal in the battery control unit 7. Whether it is a state that the charge is demanded or a state that the engine start-up is demanded is judged from the sign of the torque instruction value τo output by the integrated control unit 9. It is judged that it is in the state of the engine start-up if τo is positive, and the voltage selection signal is output to the PWM control unit 38 as low voltage (14V). It is judged that it is in the state of the charge if τo is negative, and the voltage selection signal is output as high voltage (42V). Even when the battery control unit 7 breaks down by the control like this, the engine start-up from the low-voltage terminal 12 and the charge to the high-voltage terminal 11 become possible respectively through the inverse-connection diodes provided in the low-voltage FET and the high-voltage FET. In a word, the reliability of the automobile electrical power system having a plurality of voltages is improved, because it become possible to perform the charge and the engine start-up not possible to do with the conventional switch when the battery control unit breaks down. Especially, it is useful to perform the charge to the high-voltage side even if the battery control unit breaks down, because an on-board equipment which needs the high-power is connected to the high-voltage terminal side.

Although the case with induction machine being used as the motor/generator 2 is described in the above, the present invention can be applied to the case with synchronous machine being used.

Well, although the inverter 3, the high-voltage FET 4, and the low-voltage FET 5 are assumed to be a separate component in the configuration of FIG. 1, it is also possible to mount as one module bringing these three components together. It is possible to make an integrated nodule by installing two power MOSFET chips for changing the voltage and six power MOSFET chips for the inverter in the same module. Therefore, making space-saving, the miniaturization, and making low-cost are achieved. Further, because it is possible to observe and control all power MOS FET chips with same IC if a control IC is installed in the module, the control with high accuracy can be performed and the cost can be decreased.

Next, an example of applying the present invention to the automobile power supply having three kinds of voltages will be explained with reference to FIG. 7. The battery 6 has medium voltage terminal 62 for 28V besides the high-voltage terminal 11 for 42V, low-voltage terminal 12 for 14V, and the ground terminal 13. 28V-system load 63 is connected to medium voltage terminal 62. The high-voltage terminal 11 is connected to appositive pole of inverter 3 through high-voltage FET 4, and the low-voltage terminal 12 is connected to a positive pole of inverter 3 through low-voltage FET 5. The medium voltage terminal 62 is connected to a positive pole of the inverter through medium voltage FET 61a and 62b. The medium voltage FET 61a and 62b are connected mutually in series with reversing the polarity of the diode. The purpose of this is to prevent from entering the state of the short-circuit through the diode when the high-voltage FET 4 or the low-voltage FET 5 turns on.

The present invention is applicable to the power supply with three kinds of voltages by the above-mentioned configuration. Although the detection system and the control system of the electric current and the voltage are omitted in FIG. 7, the same configuration and control method as FIG. 1 can be applied.

Figure 7:
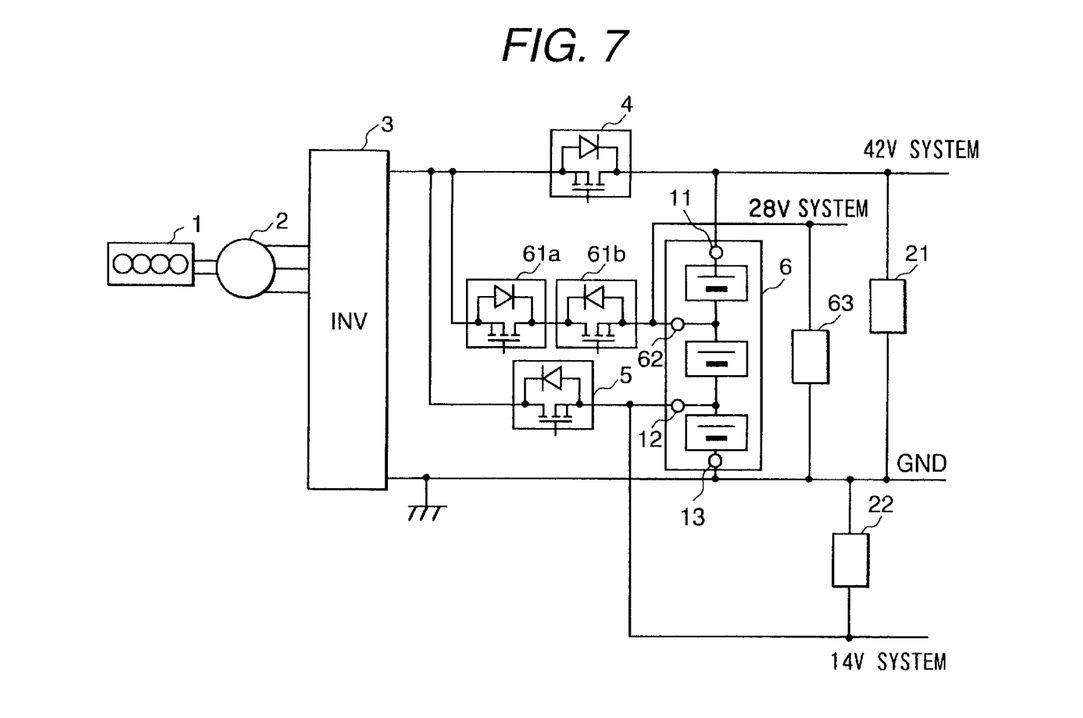
FIG. 7 shows the configuration of the automobile power-supply unit with three voltages according to one embodiment of the present invention.

Further, although the high voltage was explained as 42V in FIG. 7, it is possible to compose in the same way even if it is the voltage of 100V or more, applied to a hybrid automobile. In that case, the drive motor, the equipment for 42V and the equipment for 12V of a hybrid automobile can be driven by one battery. Moreover, the DC/DC converter need not be provided. Therefore, the cost is reduced.

According to the above-mentioned embodiment, neither a DC /DC converter nor a plurality of batteries are needed in the automobile power-supply unit which can supply a plurality of voltages. Further, the start-up of the engine and the charge of the battery can be performed even if the controller for controlling the switch which switches the voltage breaks down. Moreover, the change in the power-supply voltage when switching over can be suppressed.

What is claimed is:

1. A power-supply unit for an automobile comprising:
    a battery having a high-voltage terminal and a low-voltage terminal;
    a converter for converting AC power into DC power;
    a first switching element for controlling the power supply in one direction from the high-voltage terminal of the battery to the converter; and
    a second switching element for controlling the power supply in one direction from the converter to the low-voltage terminal of the battery.

2. The power-supply unit for an automobile according to claim 1, wherein the switching element which forms said converter and said first and said second switching element are integrated.

3. The power-supply unit for an automobile according to claim 1,
    wherein said first and said second switching element comprise a field effect transistor (FET) and diodes connected oppositely to each other, and
    wherein when the electric current is about to flow from the source side of said first or second switching element to its drain side, the gate of the switching element is turned on.

4. The power-supply unit for an automobile according to claim 1,
    wherein the voltage of the DC side of said converter is controlled according to the state of said first and said second switching element.

5. The power-supply unit for an automobile according to claim 1,
    wherein when at least one of said first and the second switching elements cannot be controlled, the voltage of the DC side of said converter is controlled according to the direction of the electric power of said converter.

6. The power-supply unit for an automobile according to claim 1, wherein said battery comprises a plurality of battery blocks connected in series.

7. The power-supply unit for an automobile according to claim 1, further comprising a charging rate measuring means for detecting the charging rate of the high-voltage terminal side of said battery and the charging rate of the low-voltage terminal side, respectively, wherein said first and said second switching element are controlled according to the charging rate detected by said charging rate measuring means.

8. The power-supply unit for an automobile according to claim 1, wherein when the voltage of the DC side of said converter is controlled according to the target voltage value at the other terminal of said battery, the correction is performed according to the voltage detection value of another terminal of said battery.

9. The automobile according to claim 1, wherein said first and said second switching element are a first and a second field effect transistor, respectively.

10. An automobile including:

a motor/generator;

an inverter for driving said motor/generator;

a battery connected to said inverter through the terminals at a plurality of different voltages;

a first switching element provided between said inverter and a first fixed terminal of the terminals at a plurality of different voltages of said battery;

a first rectifying device connected in parallel with the intermittence-switching means provided in said first switching element, for throwing more electric currents in the direction of said first terminal from said inverter;

a second switching element provided between said inverter and a second terminal at a voltage lower than that of said the first terminal of the terminals of a plurality of different voltages of said battery;

a second rectifying device connected in parallel with the intermittence-switching means provided in said second switching element, for throwing more electric currents in the direction of said second terminal from said inverter; and a battery control unit for turning on/off said first and said second switching element according to the state of the charge of said battery.

* * * * *